United States Patent
Kuo et al.

(10) Patent No.: US 7,267,451 B2
(45) Date of Patent: Sep. 11, 2007

(54) BACKLIGHT MODULE WITHOUT LIGHT GUIDING PLATE AND DIFFUSING PLATE

(75) Inventors: Yao-Yuan Kuo, Tainan County (TW); Chin-Lung Kuo, Tainan County (TW)

(73) Assignee: Chi-Lin Technology Co., Ltd. (TW)

( * ) Notice: Subject to any disclaimer, the term of this patent is extended or adjusted under 35 U.S.C. 154(b) by 91 days.

(21) Appl. No.: 11/181,712

(22) Filed: Jul. 13, 2005

(65) Prior Publication Data
US 2007/0014126 A1    Jan. 18, 2007

(51) Int. Cl.
*G09F 13/04*    (2006.01)

(52) U.S. Cl. ............................ 362/97; 362/327; 362/30
(58) Field of Classification Search ................ 362/97, 362/632, 30, 327
See application file for complete search history.

(56) References Cited

U.S. PATENT DOCUMENTS

2005/0185394 A1*  8/2005  Sakamoto et al. .......... 362/133

\* cited by examiner

*Primary Examiner*—Ali Alavi
(74) *Attorney, Agent, or Firm*—Venable LLP; Raymond J. Ho

(57) ABSTRACT

A backlight module without a light guiding plate and a diffusing plate is disclosed, in which a reflective layer having a light scattering structure is first disposed on a backplate and then at least a reflective mirror is provided on the reflective layer of the backplate. Further, a transparent plate is disposed on the at least reflective mirror. The backplate, the at least a reflective mirror, the reflective layer and the transparent plate form an enclosed space and thus the backlight module without a light guiding plate and a diffusing plate is completed. In another form of the backlight module without a light guiding plate and a diffusing plate, the light scattered structure is formed directly on the backplate. When a light-emitting unit emits a light source, the light source is uniformly given off through the light scattering structure, promoting use efficiency of the light source.

21 Claims, 9 Drawing Sheets

BACKLIGHT MODULE WITHOUT LIGHT GUIDING PLATE AND DIFFUSING PLATE

BACKGROUND OF THE INVENTION

1. Field of the Invention

The present invention relates to a backlight module and particularly to a backlight module without a light guiding plate and a diffusing plate and using light-emitting diodes (LEDs) as a light source.

2. Description of the Prior Art

Conventionally, a cold cathode fluorescent lamp (CCFL) is generally used as a light source in a liquid crystal display (LCD). However, such CCFL may not have a good color saturation obtained as compared to light-emitting diodes (LEDs) when used as the light source in the LCD.

Since the LCD is provided not only for replacement of other displays but also for the environmental protection reason, it is anticipated that the CCFL containing mercury would possibly be phased out in the future. In this regard, the light-emitting diodes can be a better choice as being a light source for the LCD.

Referring to FIG. 1, a conventional backlight module of LCD without a light guiding plate is schematically shown therein. When using LEDs 110 as a light source, the backlight module 100 further comprises an optical diverting mechanism 120 for guiding a light emitted from the LEDs 110 to a bottom reflector 130 so that the light may be efficiently guided out of the backlight module through a reflector and a diffusing plate 140 therein. However, the light from the LEDs 110 generally suffers a considerable energy loss after passing through the optical diverting mechanism 120, the bottom reflector 130, the reflector, and the diffusing plate 140 in the backlight module without a light guiding plate and thus luminance presented to a user by the light source 110 is not sufficient. For this reason, high power LEDs are required. However, this may otherwise increase cost of the backlight module 100 and thus the overall LCD.

In view of the above shortcomings, it is a critical issue regarding how to achieve a backlight module having a reduced luminance loss.

SUMMARY OF THE INVENTION

It is, therefore, an object of the present invention to provide a backlight module without a light guiding plate and a diffusing plate so as to prevent a great light energy loss of a light source in a prior backlight module due to light from the light source being guided out of the backlight module after passing through too many optical devices.

To achieve the above object, in the backlight module without a light guiding plate and a diffusing plate according to an embodiment of the present invention, a reflective layer having a light scattering structure is first disposed on a backplate and then at least a reflective mirror is provided on a side of the reflective layer. Next, at least a light-emitting unit is provided on the backplate. Further, a transparent plate is disposed on the at least a reflective mirror. The backplate, the at least a reflective mirror, the reflective layer and the transparent plate form an enclosed space and thus the backlight module without a light guiding plate and a diffusing plate is completed.

To achieve the above-object, in the backlight module without a light guiding plate and a diffusing plate according to another embodiment of the present invention, a reflective mirror is first disposed on a side of a backplate having a light scattering structure and then at least a light-emitting unit is provided on the backplate. Further, a transparent plate is disposed on the at least a reflective mirror. The backplate, the at least a reflective mirror and the transparent plate form an enclosed space and thus the backlight module without a light guiding plate and a diffusing plate is completed.

The above mentioned light scattering structure on the reflective layer or the backplate may be in any form of a corrugated shape, a ridge-like shape, a mountain shape and a saw-like shape.

The above mentioned at least a reflective mirror is shaped in compliance with the light scattering structure on the reflective layer or the backplate and in an arc-like shape.

The light-emitting unit is light emitting diodes (LEDs), which may be red, blue, green and white LEDs.

The above and other objects and advantages will be described below taken from the preferred embodiments in conjunction with the annexed drawings.

DETAILED DESCRIPTION OF THE PREFERRED EMBODIMENT

The present invention discloses a backlight module without a light guiding plate and a diffusing plate and assembly and implementation thereof will be described below taken from the preferred embodiments in conjunction with the annexed drawings.

Figure 1:
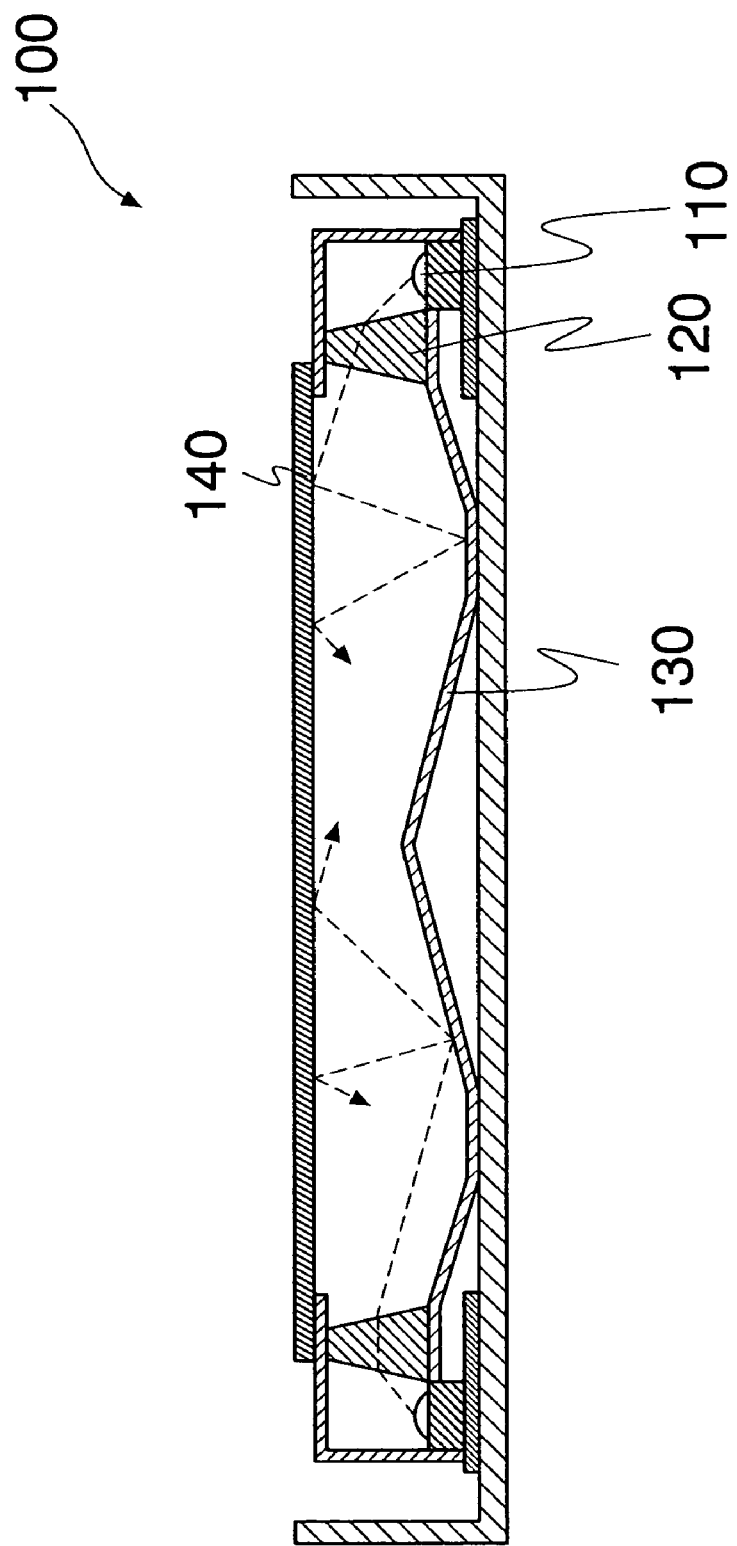
FIG. 1 shows a conventional backlight module of LCD without a light guiding plate.
Figure 2:
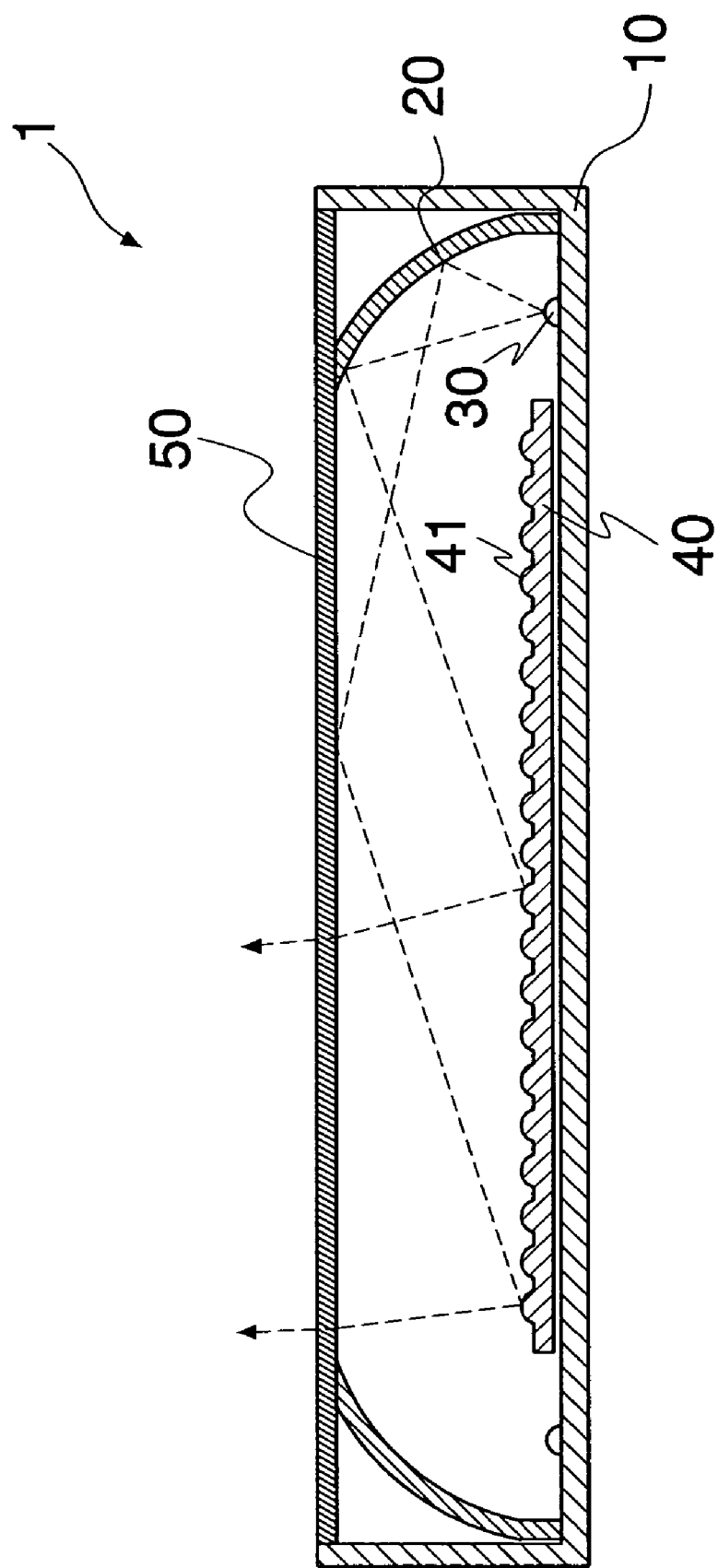
FIG. 2 shows a schematic view of a backlight module without a light guiding plate and a diffusing plate according to an embodiment of the present invention.

Referring first to FIG. 2, a backlight module without a light guiding plate and a diffusing plate, according to the present invention, is shown schematically therein. The backlight module 1 comprises a backplate 10, at least a reflective mirror 20, at least a light emitting unit 30, a reflective layer 40 and a transparent plate 5, the reflective layer 40 comprising a light scattering structure 41. In this embodiment, the light scattering structure 41 is disposed on the reflective layer 40.

An embodiment of the backlight module without a light guiding plate and a diffusing plate, in which the light scattering structure is provided on the reflective layer, will be described below in assembly and implementation therefor.

Referring again to FIG. 2, in the backlight module 1 the reflective layer 40 is first provided on the backplate 10 and the at least a reflective mirror 20 is provided on a side of the reflective layer 40. Further, at least a light-emitting unit 30 is disposed on the backplate 10, and the transparent plate 50 is disposed over the at least a reflective mirror 20. The backplate 10, the at least a reflective mirror 20, the reflective layer 40 and the transmissive layer 50 form an enclosed space and thus the backlight module 1 is completed.

In addition, the light scattering structure 41 on the reflective layer 40 is formed by punching a surface of the reflective layer 40 so that the surface is formed to have a corrugated light scattering structure 41. By means of the corrugated light scattering structure 41 on the reflective layer 40, light emitted from the at least a light-emitting unit 30 is efficiently distributed and guided out of the backlight module 1. As related to the transparent plate 50, it is made of a transparent material. Through the transparent plate 50, the light emitted from the light source of the backlight module 1 is uniformly given off.

In case of being used in an LCD module, the backlight module 1 guides light emitted from the light source therein to the reflective layer 40 through the at least a reflective mirror 20, the light being uniformly distributed on the corrugated light scattering structure 41 on the reflective layer 40. Then, the light on the light scattering structure 41 is scattered to the transparent plate 50. Since the transparent plate 50 is made of a transparent material, the light may be guided out of the backlight module 1 to be used for a LC module. Since the light emitted from the light source is transmitted by air, the light has a very high transmission rate and thus a very low light attenuation and energy loss.

In this embodiment, the reflective layer 40 of the backlight module 1 is a bottom reflector or a reflective film.

Another embodiment of the backlight module without a light guiding plate and a diffusing plate, in which the light scattering structure is provided on the backplate, will be described below in assembly and implementation therefor.

Figure 3:
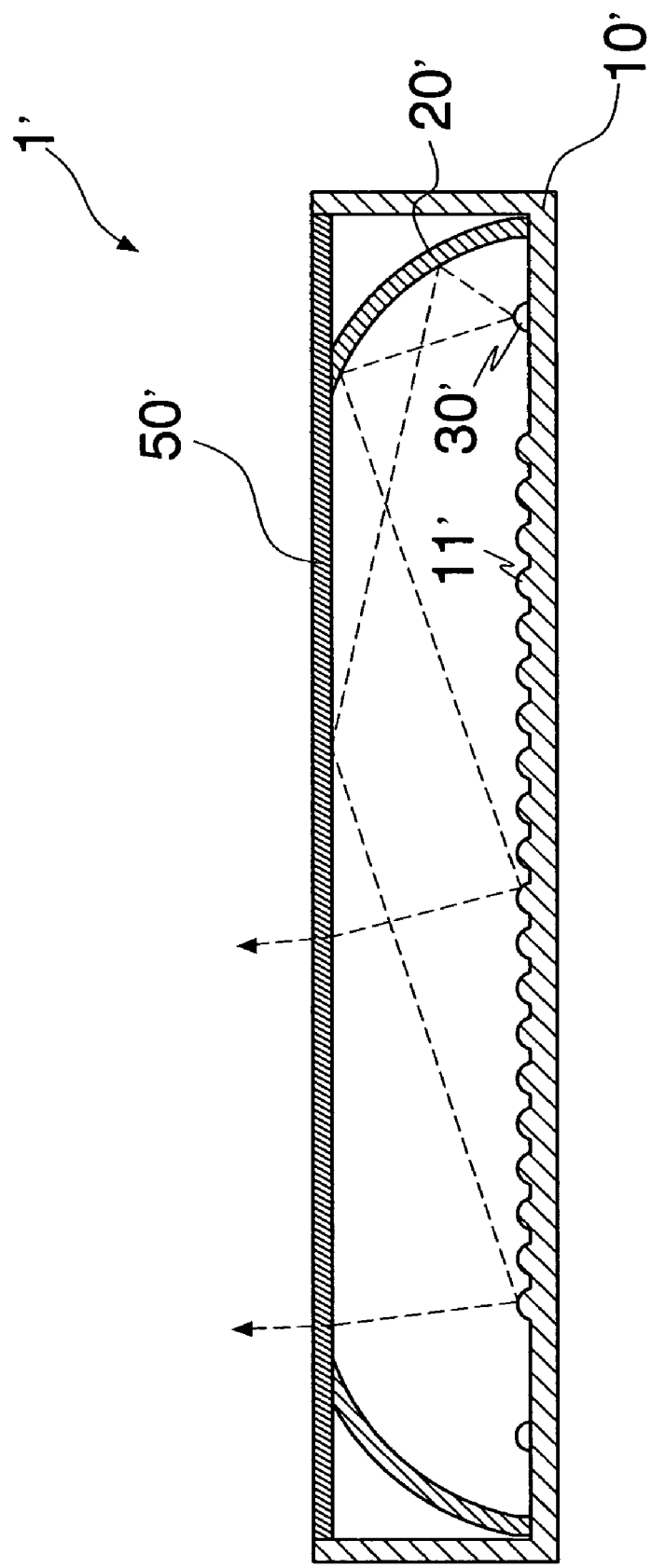
FIG. 3 shows a schematic view of the backlight module without a light guiding plate and a diffusing plate according to another embodiment of the present invention.

Referring to FIG. 3, another embodiment of the backlight module without a light guiding plate 1' and a diffusing plate according to the present invention is shown schematically therein. The backlight module 1' comprises a backplate 10', at least a reflective mirror 20', at least a light-emitting unit 30' and a transparent plate 50', the backplate 10', comprising a light scattering structure 11'.

Referring again to FIG. 3, in the backlight module 1' the at least a reflective mirror 20' is first provided on a side of the backplate 10'. Further, the at least a light-emitting unit 30' is disposed on the backplate 10', and the transparent plate 50' is disposed over the at least a reflective mirror 20'. The backplate 10', the at least a reflective mirror 20' and the transparent layer 50' form an enclosed space and thus the backlight module 1' is completed.

In addition, the light scattering structure 11' on the backplate 10' is formed by punching a surface of the backplate 10' so that the surface is formed to have a corrugated light scattering structure 11'. By means of the corrugated light scattering structure 11' on the backplate 10', light emitted from the at least a light-emitting unit 30' is efficiently distributed and guided out of the backlight module 1'. As related to the transparent plate 50', it is made of a transparent material. Through the transparent plate 50, the light source of the backlight module 1 is uniformly given off.

In case of being used in a LC module, the backlight module 1' guides light emitted from the at least a light-emitting unit 30' therein to the backplate 10' through the at least a reflective mirror 20', the light being uniformly distributed on the corrugated light scattering structure 11' on the backplate 10'. Then, the light on the light scattering structure 11' is scattered to the transparent plate 50'. Since the transparent plate 50' is transparent, the light may be guided out of the backlight module 1' to be used for the LC module. Since the light source is transmitted by air, the light has a very high transmission rate and thus a very low light attenuation and energy loss.

Figure 4:
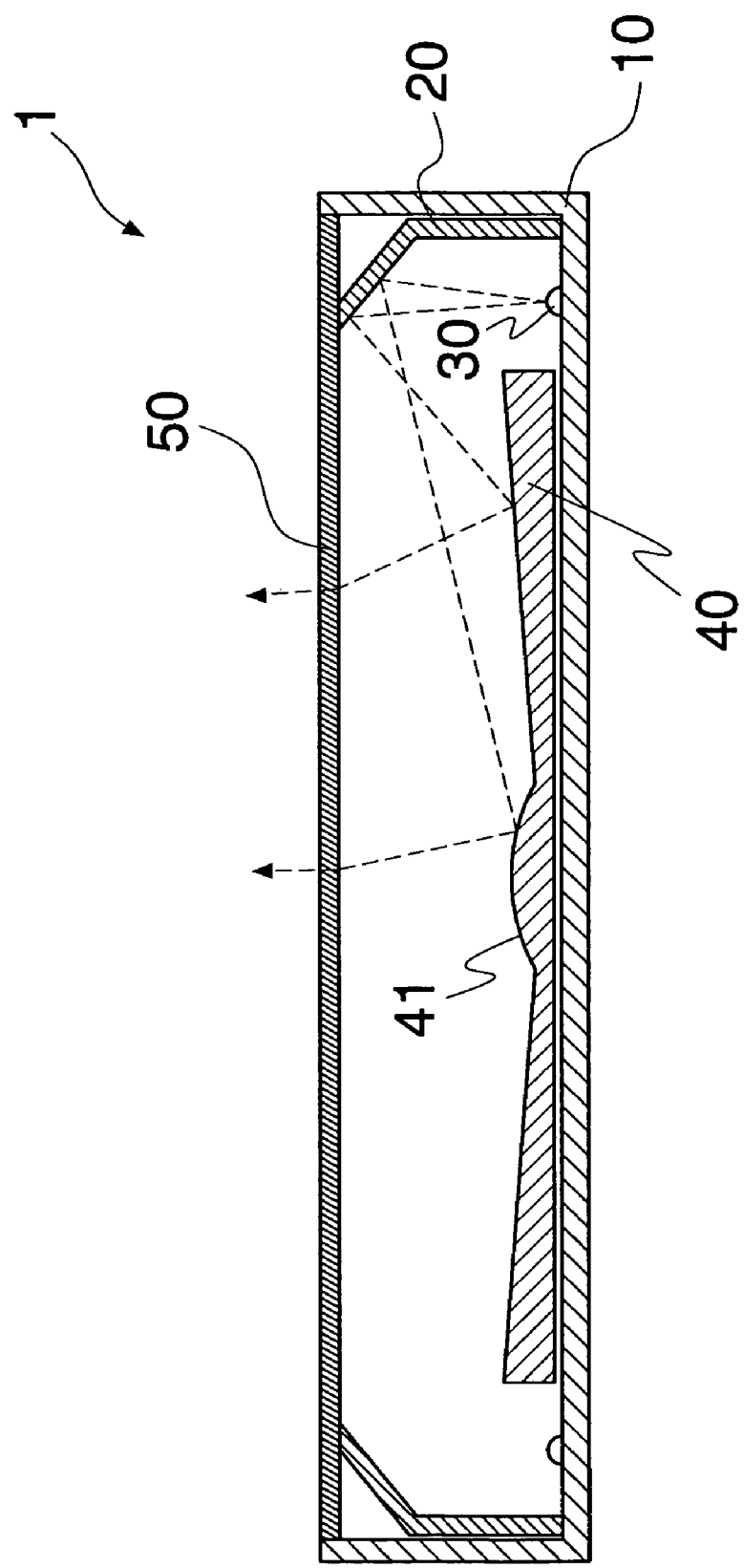
FIG. 4 shows a schematic view illustrating a light scattering structure of a ridge shape formed on the reflective layer in the backlight module without a light guiding plate and a diffusing plate according to the present invention.
Figure 5:
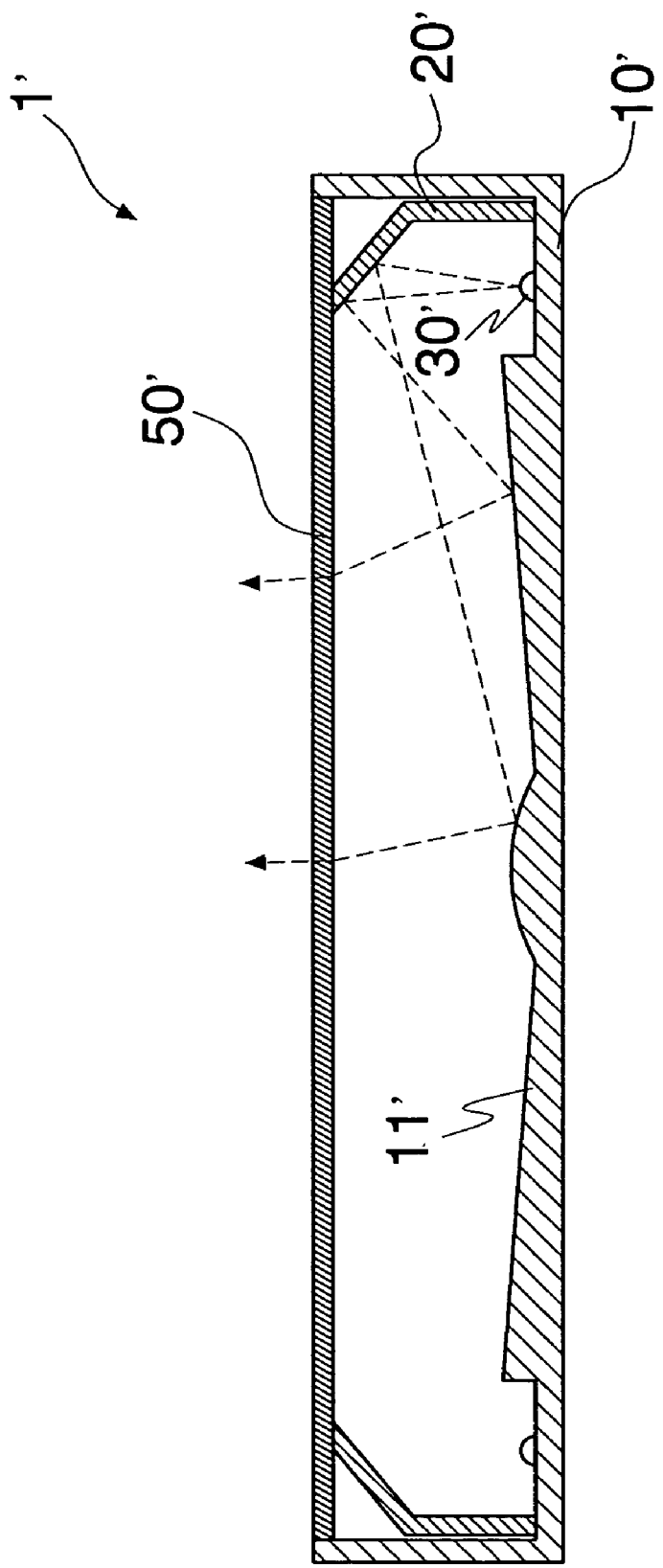
FIG. 5 shows a schematic view illustrating a light scattering structure of a ridge shape formed on the backplate in the backlight module without a light guiding plate and a diffusing plate according to the present invention.
Figure 6:
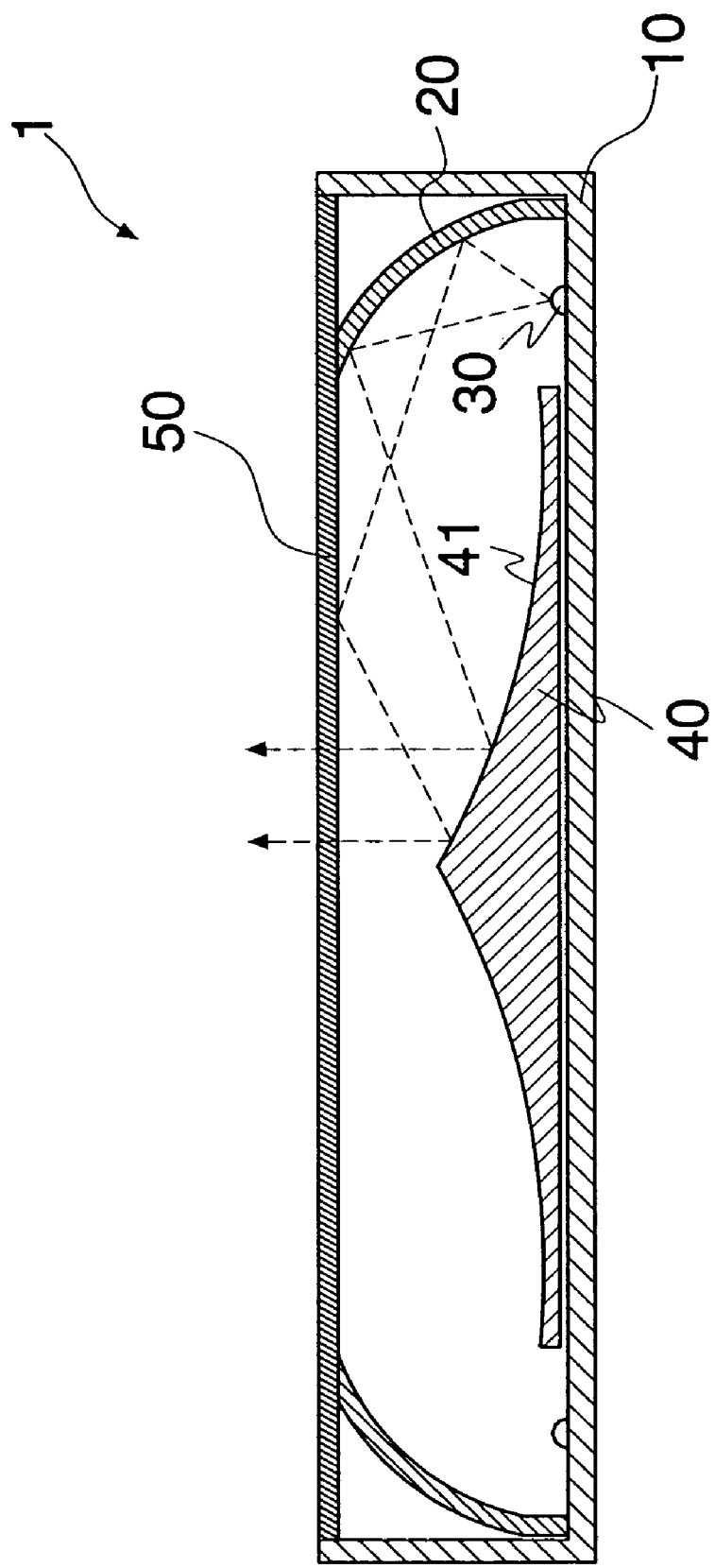
FIG. 6 shows a schematic view illustrating a light scattering structure of a mountain shape formed on the reflective layer in the backlight module without a light guiding plate and a diffusing plate according to the present invention.
Figure 7:
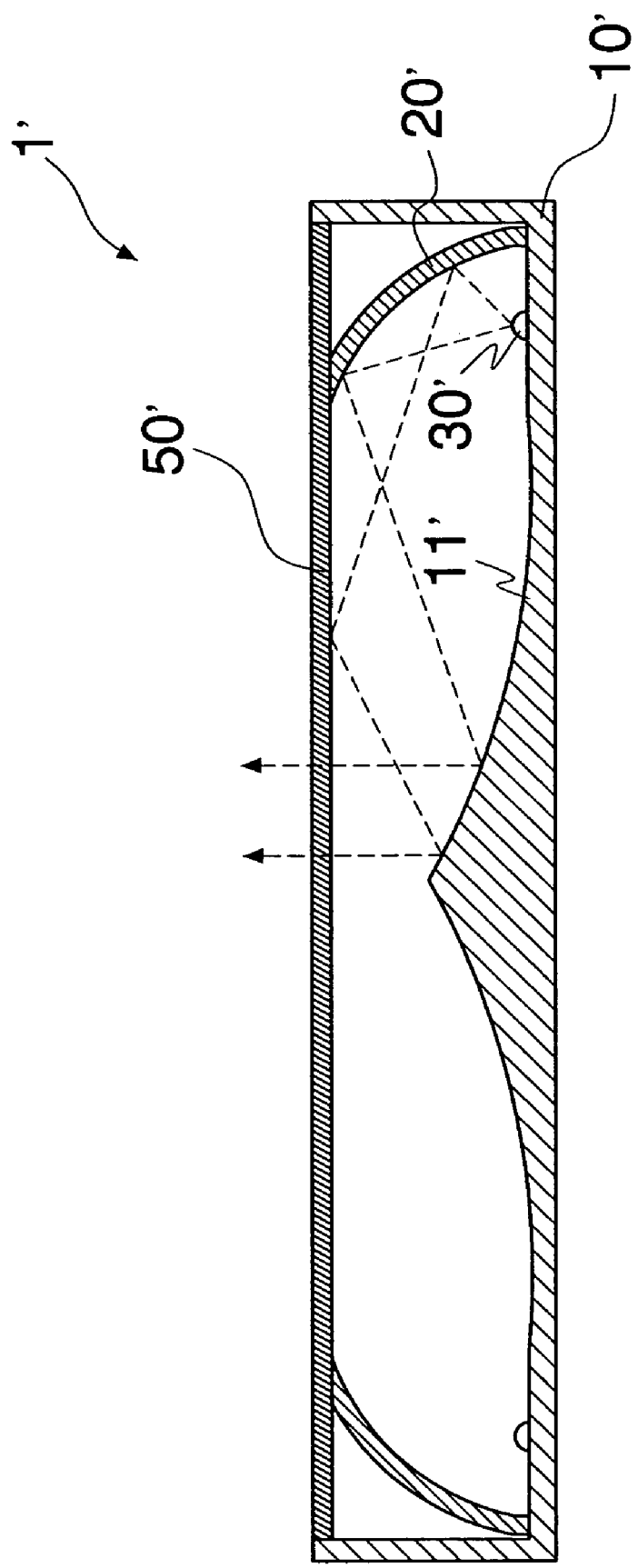
FIG. 7 shows a schematic view illustrating a light scaffering structure of a mountain shape formed on a side of a backplate in the backlight module without a light guiding plate and a diffusing plate according to the present invention.
Figure 8:
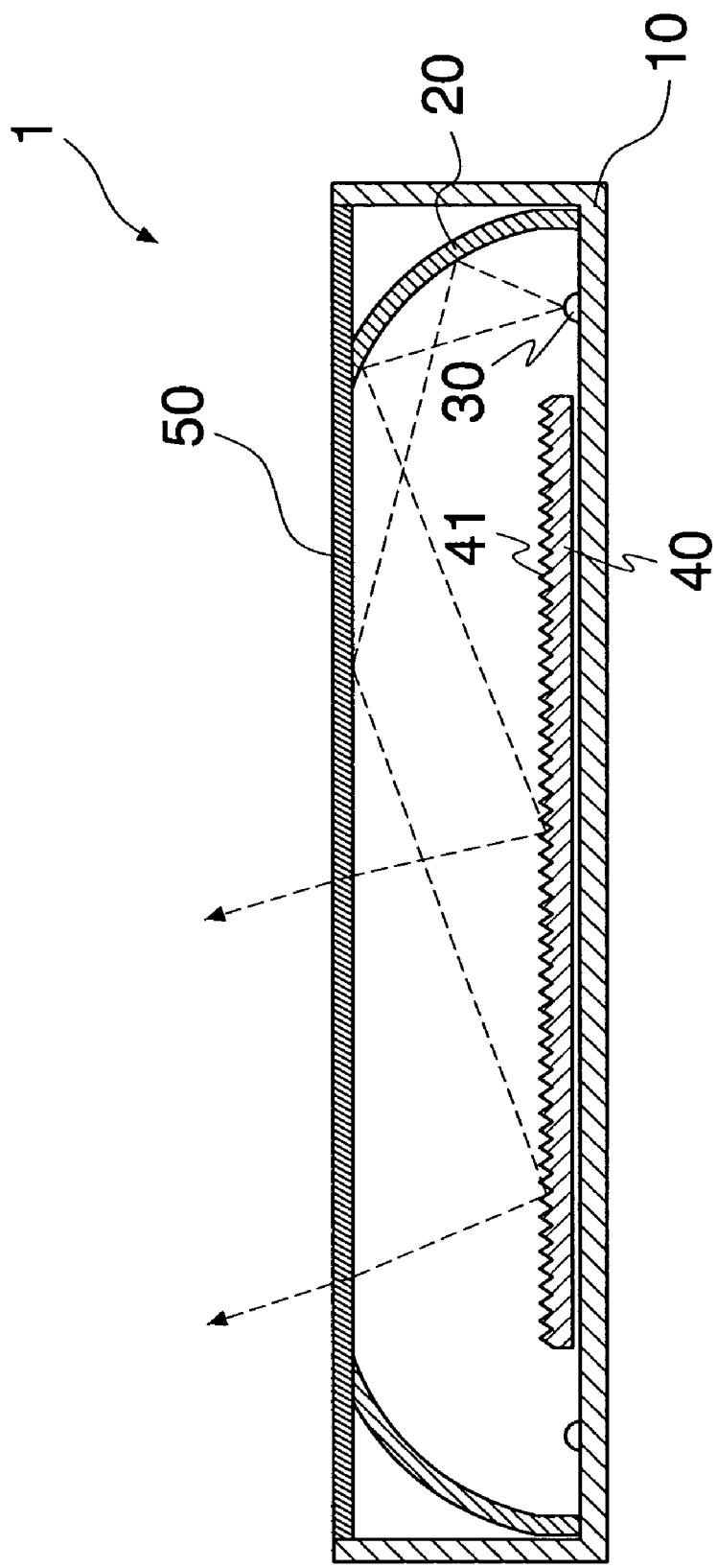
FIG. 8 shows a schematic view illustrating a light scattering structure of a saw-like shape formed on the reflective layer in the backlight module without a light guiding plate and a diffusing plate according to the present invention.
Figure 9:
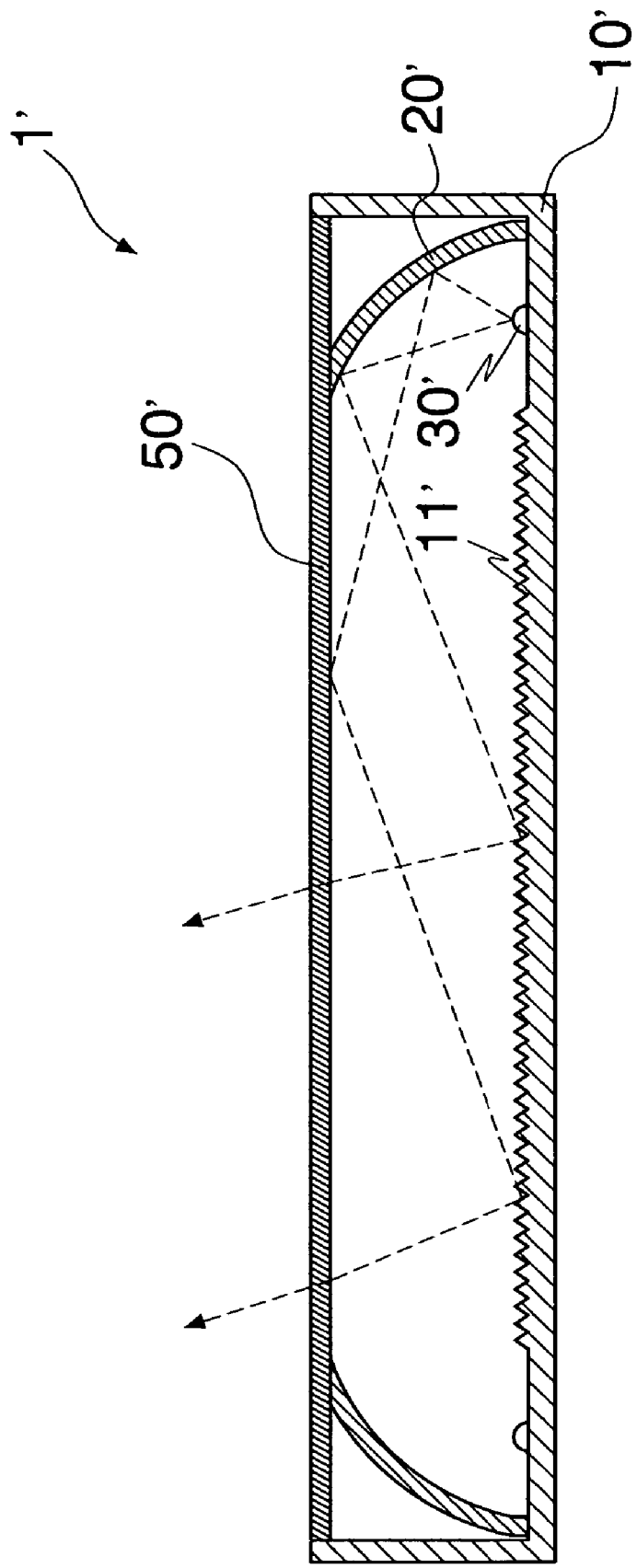
FIG. 9 shows a schematic view illustrating a light scattering structure of a saw-like shape formed on the backplate in the backlight module without a light guiding plate and a diffusing plate according to the present invention.

In the inventive backlight module without a light guiding plate and a diffusing plate 1, 1', it is described that the light scattering structure of the reflective layer 40 or backplate 10' is in a corrugated shape. However, other shapes are also contemplated in this invention. Referring to FIG. 4 to FIG. 9, the light scattering structures on the reflective layers or the backplates are described as being in other shapes. As shown in FIG. 4 and FIG. 5, the light scattering structures formed on the reflective layer 40 or backplate 10' are each in a ridge-like shape. As shown in FIG. 6 and FIG. 7, the light scattering structures 41, 11' in a mountain shape are formed on the reflective layer 40 or the backplate 10'. As shown in FIG. 8 and FIG. 9, the light scattering structures 41, 11' in a saw-like shape are formed on the reflective layer 40 or the backplate 10'. As related to the reflective mirrors 20 and 20', they are shaped in compliance with the light scattering structures 41 and 11' on the reflective layer 40 or the backplate 10', respectively, and in an arc-like shape.

When a critical demand is placed on luminance of the light source, the reflective mirrors 20, 20' are coated with a highly reflective material in the backlight module 1, 1', so that each light emitted may achieve a total reflection effect when contacting the reflective mirrors 20, 20'. To this end, the reflective mirrors 20, 20' are each further coated with a resin material containing a light stabilizer and a reflective agent as a highly reflective layer. In addition, the reflective mirrors 20, 20' are plated with a highly reflective material in the backlight module 1, 1', so that each light emitted may achieve a total reflection effect when contacting the reflective mirrors 20, 20'. The reflective mirror is further plated with a highly reflective material and the highly reflective material includes aluminum, tin, and zinc.

In the backlight modules 1, 1', the light-emitting unit 30, 30' are LEDs, which may be red, blue, green and white LEDs.

In the backlight modules 1, 1', the transparent plate 50' is made of a transparent material.

The backlight module without a light guiding plate and a diffusing plate is set forth based on an effort of many years and provides at least the following advantages, compared with the reference. 1. No light guiding plate and diffusing plate is required, the backlight module is slighter in weight. 2. The light source in the backlight module is transmitted by air since no light guiding plate and diffusing plate is provided, through which the light source has a higher light transmission rate and thus a reduced light attenuation rate and energy loss. 3. Since no light guiding plate and diffusing plate is provided, the backlight module is dependent on lesser components therein and thus reliability of the components therein is less critical. 4. Since no light guiding plate and diffusing plate is provided, the backlight module is relatively cost saved. 5. Since LEDs are used as the light-emitting unit, the light source in the backlight module has a more concentrated light pointing characteristic, benefiting a uniform distribution of the light source.

While this invention has thus far been described in connection with the preferred embodiments thereof, it will readily be possible for those skilled in the art to put this invention into practice in various other manners without departing from the scope set forth in the appended claims.

What is claimed is:

1. A backlight module without a light guiding plate and a diffusing plate comprising:
   a backplate;
   a reflective layer having a light scattering structure;
   at least a reflective mirror disposed on a side of said reflective layer;
   at least a light-emitting unit disposed on said backplate; and
   a transparent plate disposed over said reflective mirror to form an enclosed space.

2. The backlight module according to claim 1, wherein said light scattering structure on said reflective layer is in a corrugated shape, a ridge-like shape, a mountain shape or a saw-like shape.

3. The backlight module according to claim 1, wherein said reflective mirror is in an arc-like shape.

4. The backlight module according to claim 1, wherein said transparent plate is made of a transparent material.

5. The backlight module according to claim 1, wherein said reflective mirror is coated with a highly reflective material.

6. The backlight module according to claim 1, wherein said light-emitting unit is light-emitting diodes (LEDs).

7. The backlight module according to claim 5, wherein said highly reflective material is a resin material containing a light stabilizer and a reflective agent.

8. The backlight module according to claim 6, wherein said LEDs are red, green, blue or white LEDs.

9. The backlight module according to claim 1, wherein said reflective layer is a bottom reflector or a reflective film.

10. The backlight module according to claim 1, wherein said reflective mirror is further plated with a highly reflective material.

11. The backlight module according to claim 10, wherein said highly reflective material is selected from the group of aluminum, tin, and zinc.

12. The backlight module without a light guiding plate and a diffusing plate, comprising:
    a backplate having a light scattering structure on a side thereof
    at least a reflective mirror disposed on a side of said backplate;
    at least a light-emitting unit disposed on said backplate; and
    a transparent plate disposed over said reflective mirror to form an enclosed space.

13. The backlight module according to claim 12, wherein said light scattering structure on said backplate is in a corrugated shape, a ridge-like shape, a mountain shape or a saw-like shape.

14. The backlight module according to claim 12, wherein said reflective mirror is in an arc-like shape.

15. The backlight module according to claim 12, wherein said transparent plate is made of a transparent material.

16. The backlight module according to claim 12, wherein said reflective mirror is coated with a highly reflective material.

17. The backlight module according to claim 12, wherein said light-emitting unit is light-emitting diodes (LEDs).

18. The backlight module according to claim 16, wherein said highly reflective material is a resin material containing a light stabilizer and a reflective agent.

19. The backlight module according to claim 17, wherein said LEDs are red, greens blue or white LEDs.

20. The backlight module according to claim 12, wherein said reflective mirror is further plated with a highly reflective material.

21. The backlight module according to claim 20, wherein said highly reflective material is selected from the group of aluminum, tin, and zinc.

* * * * *